US010826910B2

(12) United States Patent
Disraeli

(10) Patent No.: US 10,826,910 B2
(45) Date of Patent: *Nov. 3, 2020

(54) FRICTIONLESS MULTI-FACTOR AUTHENTICATION SYSTEM AND METHOD

(71) Applicant: TeleSign Corporation, Marina del Rey, CA (US)

(72) Inventor: Ryan Parker Disraeli, Los Angeles, CA (US)

(73) Assignee: TeleSign Corporation, Marina del Rey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/101,821

(22) Filed: Aug. 13, 2018

(65) Prior Publication Data

US 2019/0238554 A1 Aug. 1, 2019

Related U.S. Application Data

(63) Continuation of application No. 15/167,834, filed on May 27, 2016, now Pat. No. 10,050,976, which is a
(Continued)

(51) Int. Cl.
*H04L 29/06* (2006.01)
*G06F 21/31* (2013.01)
(Continued)

(52) U.S. Cl.
CPC ............ *H04L 63/107* (2013.01); *G06F 21/31* (2013.01); *H04L 63/083* (2013.01);
(Continued)

(58) Field of Classification Search
CPC . H04L 63/107; H04L 63/083; H04L 63/0853; H04L 2463/082; H04L 67/02;
(Continued)

(56) References Cited

U.S. PATENT DOCUMENTS 8,793,776 B1 * 7/2014 Jackson ................. H04W 4/023
726/7
2010/0024017 A1 * 1/2010 Ashfield ................. G06F 21/35
726/7

(Continued)

*Primary Examiner* — Joseph P Hirl
*Assistant Examiner* — Chi D Nguy
(74) *Attorney, Agent, or Firm* — Perkins Coie LLP

(57) ABSTRACT

A frictionless multi-factor authentication system and method ("FMFA system") that facilitates verification of the identity of a website user, registrant or applicant. The FMFA system reduces or removes the burden on the user by eliminating the additional manual second step traditionally required by two-factor authentication methods, and replacing the second step with an automated authentication step based on the location of a mobile device that is associated with the user. The FMFA system may be utilized for authenticating users to access sensitive data on online accounts, applications and websites, download files, perform online transactions, store information through websites or data stores, or the like. The FMFA system allows registration information obtained from a previously-registered user to authenticate the user on subsequent visits or logins to the website.

16 Claims, 10 Drawing Sheets

Related U.S. Application Data continuation of application No. 13/706,261, filed on Dec. 5, 2012, now Pat. No. 9,355,231.

(51) Int. Cl.
*H04W 4/029* (2018.01)
*H04W 12/06* (2009.01)
*H04W 4/02* (2018.01)
*H04L 29/08* (2006.01)
*H04W 12/00* (2009.01)

(52) U.S. Cl.
CPC ........... *H04L 63/0853* (2013.01); *H04W 4/02* (2013.01); *H04W 4/029* (2018.02); *H04W 12/06* (2013.01); *G06F 2221/2111* (2013.01); *H04L 67/02* (2013.01); *H04L 2463/082* (2013.01); *H04W 12/00512* (2019.01)

(58) Field of Classification Search
CPC .. G06F 21/31; G06F 2221/2111; H04W 4/02; H04W 12/06
See application file for complete search history.

(56) References Cited

U.S. PATENT DOCUMENTS

| | | | | |
|---|---|---|---|---|
| 2011/0138483 A1* | 6/2011 | Bravo | ................ | G06F 21/35 |
| | | | | 726/29 |
| 2012/0144468 A1* | 6/2012 | Pratt | ................ | G06F 21/40 |
| | | | | 726/7 |
| 2013/0110715 A1* | 5/2013 | Buchhop | ................ | G06Q 40/02 |
| | | | | 705/42 |
| 2013/0198046 A1* | 8/2013 | Hammad | ................ | G06Q 30/06 |
| | | | | 705/30 |

* cited by examiner

FRICTIONLESS MULTI-FACTOR AUTHENTICATION SYSTEM AND METHOD

CROSS-REFERENCE TO RELATED APPLICATION(S)

This application is a continuation of U.S. patent application Ser. No. 15/167,834, now U.S. Pat. No. 10,050,976, entitled "FRICTIONLESS MULTI-FACTOR AUTHENTICATION SYSTEM AND METHOD," filed on May 27, 2016, which is a continuation of U.S. patent application Ser. No. 13/706,261, now U.S. Pat. No. 9,355,231, entitled "FRICTIONLESS MULTI-FACTOR AUTHENTICATION SYSTEM AND METHOD," filed on Dec. 5, 2012, the disclosure of which is incorporated herein by reference in its entirety.

BACKGROUND

Internet users regularly register with websites, cloud applications, or other web-based programs (each hereinafter a "website"). The user's registration information is generally kept confidential and used for the purpose of allowing the registrant or user to enter the website through a login process, and access the services offered by the website.

Fundamental to every secure transaction is user or registrant identity authentication. Identity authentication is particularly important with Internet-based transactions where user identity cannot be verified by more traditional means such as visual inspection and verification of a government-issued photo identification card. Reliable authentication and identity verification of businesses and/or individuals that engage in Internet-based commerce or information exchange is therefore a business necessity. Despite these authentication requirements, fraud is still prevalent on the Internet and often Internet fraud-impostors or "fraudsters" register or login to websites with access to sensitive data using untraceable or false email addresses and/or phone numbers, or use other such scheming methods that compromise the traditional authentication processes currently in place for such websites. For example, a common exploit employed by fraudsters is called "account takeover" where a fraudster "tricks" or steals the login credentials (e.g., username and password) of a user, often via a piece of software that records a user's keystrokes (keylogger) or as a result of a security breach on a user's computer. These "stolen" login credentials then allow the fraudster access to the user's account. Often, the effect of such a breach can be devastating to website owners and users whose secure information may be accessed, or who may otherwise be defrauded as a result. The increased occurrence of fraud is especially concerning as more commerce and transactions move online and fraudster sophistication increases.

Concerned about the potential for fraud during Internet-based transactions, security researchers highly recommend the use of authentication methods that do not rely solely on traditional, single-control methods requiring only a username and password to gain access to a website or application. In fact, in its Supplement to Authentication in an Internet Banking Environment, the Federal Financial Intuitions Examination Council Agencies ("FFIEC") acknowledged that there have been significant changes in security threats to Internet-based transactions, and expressed concern that the methods and controls traditionally in place have become less effective against the potential for malicious attacks that may compromise authentication and security. The FFIEC's report highly recommends use of a "layered" or "multifactor" security for authentication and fraud prevention for Internet-based transactions. Accordingly, one such recommended "effective control" is the use of "two-factor authentication", or a method that utilizes at least an additional authentication layer in addition to the initial username and password login, often through a different access device.

The limited types of two-factor authentication that currently exist are centered on a first layer process that utilizes predetermined information that the user or registrant is expected to know, often referred to as "something you know," e.g., the username and password. The second layer of authentication, often referred to as "something you have," is then based on a physical item that the registrant or user has possession of and that can be used for verification of the user or registrant's identity, e.g., a physical token, or the registrant or user's mobile device or other such communicative device. Additionally, the second layer of verification can instead be achieved with biometric identification, such as fingerprint or voice recognition, often referred to as "something you are." In two-factor authentication processes, the second layer of authentication requires the user or registrant to perform an additional step in addition to entry of a username and password before authentication can be completed. Unfortunately, because of the need for a second step, there has been limited adoption and proper utilization of two-factor authentication measures, even as security threats to Internet-based transactions continue to increase.

Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Figure 1:
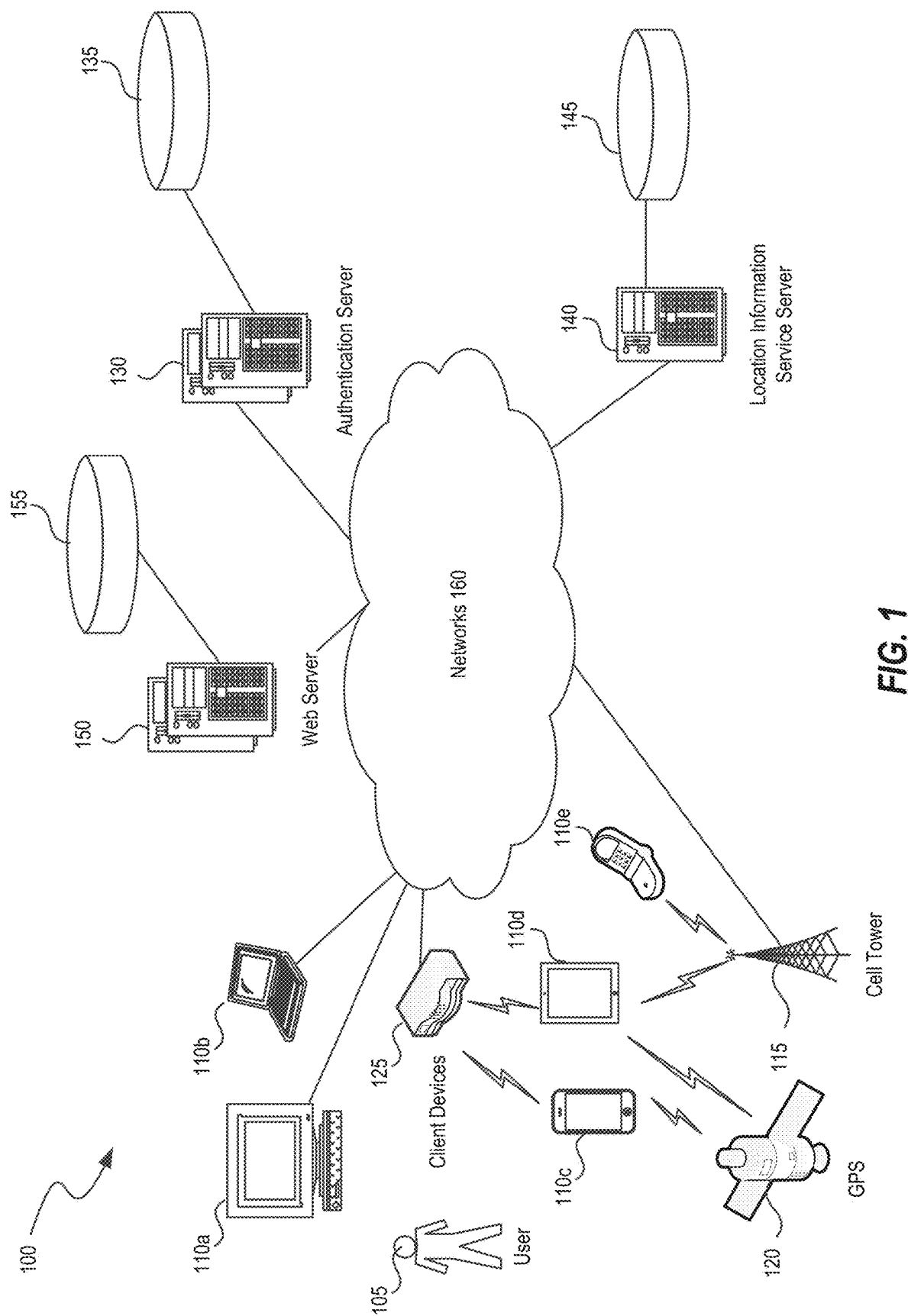
FIG. 1 is a diagram illustrating an example environment in which frictionless multi-factor authentication may be implemented.

A frictionless multi-factor authentication system and method ("FMFA system") that facilitates verification of the identity of a website user, registrant or applicant (hereinafter "user") in a frictionless manner is described herein. The FMFA system reduces or removes the burden on the user by eliminating the additional manual second step (e.g., entry of token, card swipe, etc.) traditionally required by two-factor authentication methods, and replacing the second step with an automated authentication step based on the location of a mobile device that is associated with the user. The FMFA system may be utilized for authenticating users to access sensitive data on online accounts, applications and websites, download files, perform online transactions, store information through websites or data stores, or the like. Because of the minimal burden imposed on the user, the FMFA system boosts adoption and proper utilization of authentication measures.

The FMFA system facilitates verification of a user during a user registration process. Generally, a registration form or other data-entry interface is provided to a user as the user creates a user account with a website. The user provides information requested by the registration form, such as login credentials (e.g., a username and a password) and a mobile telephone number or other identifier of a mobile device whose location can be determined (i.e., any device identifier that may be used to determine the location of the user using, for example, GPS or other location determination technology). When the registration form is submitted to the website, a location-based authentication method is utilized by the system to verify the user. The location-based authentication method may be performed in the background, without user involvement, utilizing a Location Based Service ("LBS"). The LBS is used to determine the location of the mobile device (e.g., the user's mobile phone) using, for example, GPS or other location-determination technology. The location of the computer or device from which the registration attempt is being made is estimated by the system using such information as the Internet Protocol ("IP") address of the computer or device. The system assesses whether the location of the mobile device and the location of the computing device used to access the website match. A successful match is used to authenticate the user and verify the user registration.

The FMFA system allows registration information obtained from a previously-registered user to authenticate the user on subsequent visits or logins to the website. For example, the registered user may attempt to login to the website using the user's username and password. A correct entry of both the username and password satisfies the first factor of authentication and triggers the location-based authentication factor. Location based services are used by the system to match the location of a mobile device associated with the user and the location of the computer or device being used by the user to access the website. By estimating the location of the user via the user's mobile device, and matching the user's location with the location of a computer or other device used by the user to access the website, the user is automatically authenticated without disrupting the user or requiring the user to manually perform a second authentication step.

If the user cannot be authenticated using the location of the mobile device associated with the user, additional verification steps may be implemented by the system. For example, the system may require that the user go through a traditional form of manual two-factor authentication such as receiving a phone call or SMS verification message, using a hardware token, answering a knowledge-based question, or other verification step requiring user response. The traditional form of two-factor authentication is a backup authentication, details of which are discussed in U.S. patent application Ser. Nos. 11/034,421 and 11/538,989 and issued U.S. Pat. No. 7,945,034. The content of the aforementioned applications are hereby expressly incorporated by reference in their entirety.

Various implementations of the invention will now be described. The following description provides specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

Suitable Environments

The Frictionless Multi-Factor Authentication (FMFA) system may be implemented in a suitable computing environment 100, such as the one shown in FIG. 1. Although not required, aspects and implementations of the FMFA system will be described in the general context of computer-executable instructions, such as routines executed by a general-purpose computer, a personal computer, a server, or other computing systems. Embodiment of the FMFA system may also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Embodiments of the FMFA system may be implemented in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the FMFA system described herein may be stored or distributed on tangible, non-transitory computer-readable media, including magnetic and optically readable and removable computer discs, stored in firmware in chips (e.g., EEPROM chips), an array of devices (e.g., Redundant Array of Independent Disks (RAID)), solid state memory devices (e.g., solid state drives (SSD), Universal Serial Bus (USB)), and/or the like. Alternatively, aspects of the FMFA system may be distributed electronically over the Internet or over other networks (including wireless networks). Those skilled in the relevant art will recognize that portions of the FMFA system may reside on a server computer, while corresponding portions reside on a client computer. Data structures and transmission of data particular to aspects of the FMFA system are also encompassed within the scope of the invention.

Referring to FIG. 1, the FMFA system operates in environment 100. Client devices, such as desktop computer 110a, laptop computer 110b, tablet 110d, mobile device 110c, feature phone 110e, and the like, are used by users to access websites that are hosted by server computers, such as web server 150. An authentication server 130 and location information service server 140 may connect to and communicate with each other across networks 160. Networks 160 may include wired and wireless, private networks and public networks (e.g., the Internet). Client devices 110a-110e use network interfaces to connect and/or communicate with networks 160, either directly, or via wireless routers 125, or cell towers 115. Network interfaces may employ connection protocols such as direct connect, Ethernet, wireless connection such as IEEE 802.11a-n, and the like to connect to networks 160. Some client devices such as devices 110c-110d may be configured with a Global Positioning System (GPS) or Assisted Global Positioning System (A-GPS) receiver to receive signals broadcast by GPS satellites 120. Some client devices such as devices 110c-110e may be equipped with transceiver circuitry to handle radio communications to wirelessly communicate with nearby cell towers or base stations 115 using wireless mobile telephone standards such as Global System for Mobile Communications (GSM), CDMA (Code Division Multiple Access), General Packet Radio Service (GPRS), and/or the like. Some of these client devices may be designated as "login clients" while others as "verification clients." A login client as used herein refers generally to a client device used for logging in or signing in to a website. A verification client as used herein refers generally to a client device that is designated by the user as a device for locating the user. A verification client is usually a mobile device, often in the user's possession at the time of login, and is capable of being located using various positioning technologies.

The location information service 140 may be any location based service (LBS) provider that utilizes various positioning technologies to locate mobile devices. The positioning technologies may be mobile-based, mobile-assisted or network-based. In a mobile-based solution, the positioning is carried out on the verification client (e.g., a handset) using positioning technologies such as Cell ID, Advanced Forward Link Trilateration (AFLT), GPS/A-GPS, and/or the like. In a mobile-assisted solution, the verification client makes the measurements and reports the measurements to the mobile network where the serving mobile location center node (e.g., location information service) calculates the verification client position. Example positioning technologies that are mobile-assisted include Enhanced Forward Link Trilateration (EFLT), Time Difference of Arrival (TDOA), Enhanced Observed Time Difference (E-OTD) and A-GPS. Similarly, in a network-based solution, the positioning is performed by the network which may rely on positioning technologies such as Angle of Arrival (AOA). These positioning technologies may have varying accuracies. For example, using Cell ID, a mobile device can be located with an accuracy of 100 m-3 km, while using GPS/A-GPS, the accuracy of the location may be in the range of 5-30 m. The solution implemented by the location information service may depend on the capabilities of the verification client, the mobile network, and the accuracy requirement.

Location information service 140 is a server or servers that may be coupled to one or more database tables such as database table 145. In one embodiment, location information service 140 may be operated by a third party to provide location-based services and/or location information to requesting clients such as client devices 110a-110e, web server 150 and/or authentication server 130. In another embodiment, location information service 140 may be a server or servers operated by or under the control of web server 150 or authentication server 130. The operating entity can then directly access verification client location data determined by location information service 140. In yet another embodiment, location information service 140 may be a part of web server 150 or authentication server 130, and not a separate server. In other words, web server 150 or authentication server 130 can be configured to perform all of the functions of location information service 140.

The web server 150 is a server that hosts one or more websites and stores data. Web servers deliver web pages to requesting clients. Web server 150 may be coupled to one or more database tables such as database table 155. The authentication server 130 is a server handling authentication of users and/or client devices, and may be coupled to one or more database tables, such as database table 135. When users attempt to access websites, either for the first time or on subsequent visits, requests are sent to the authentication server 130 to authenticate the user. The authentication server 130 utilizes the location information provided by location information service 140 as part of the authentication process.

Database tables 155, 135 and 145 store data utilized by the FMFA system, and, in some implementations, software necessary to perform various functions of the system. The term "server" as used herein refers generally to a computer, device, program or combination thereof that processes and responds to requests from remote clients across a network. The term "client" as used herein refers generally to a computer, device, program or combination thereof that is capable of processing and making requests, obtaining and processing responses from servers via a network.

Suitable Systems

Figure 2:
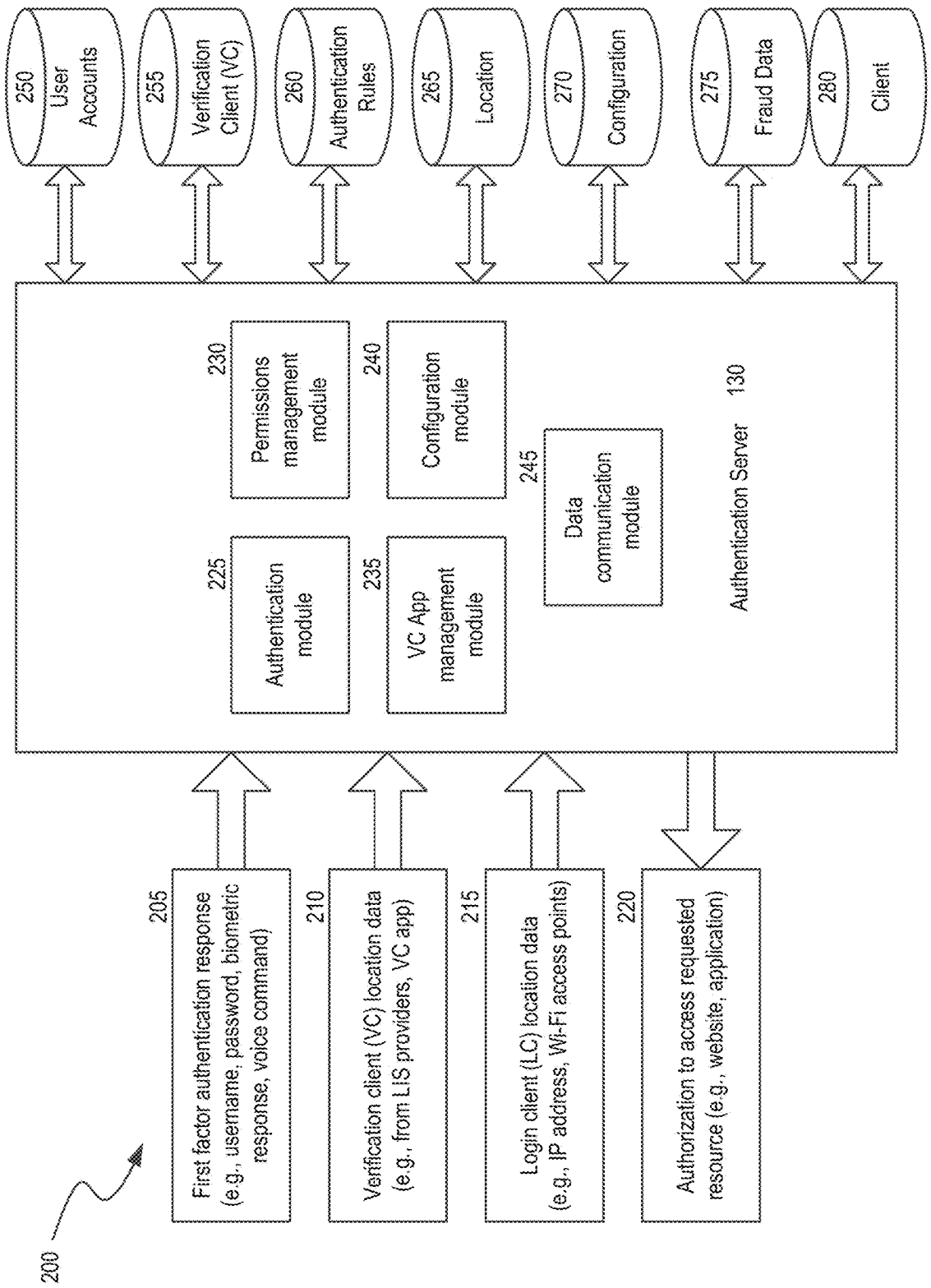
FIG. 2 is a block diagram of a frictionless multi-factor authentication (FMFA) system that provides multi-factor authentication.

FIG. 2 is a block diagram of modules in the FMFA system 200 and some of the data that is received, stored, processed and transmitted by the system. FMFA system 200 receives as input user-provided first factor authentication responses and location data relating to one or more user-associated client devices, performs a first authentication with user involvement followed by a second authentication without direct user involvement, and provides as output authorization to access a requested resource. In the process of performing the authentication based on the second factor, the FMFA system 200 may apply one or more authentication rules to location data, and in some implementations, may use location data to dynamically adjust thresholds for successful authentication.

Various inputs may be provided to authentication server 130 as part of the authentication process. For example, a user response 205 may be provided to the authentication server 130 to allow the server to perform an authentication of the user based on a first factor. The first authentication factor may be selected from the three authentication factors which include something the user knows, something the user has and something the user is. The user response 205 may include, for example, a username and password combination, security code, token, biometric characteristic such as a fingerprint, gesture, voice command, and the like. The user response 205 may not be necessary in those situations where a website performs a user authentication based on a first-factor and the authentication server 130 is only used to perform a user authentication based on a second factor. Instead, an instruction to perform the authentication using the second factor may be provided as an input to the authentication server 130. The instruction may be generated by another entity such as a web server hosting the website, and indicates that the user has been authenticated using a first-factor and that the web server is seeking to authenticate the user using an additional factor.

Authentication server 130 may also receive verification client location data 210 obtained from sources such as a location information service, an application residing in the verification client, or the like. Authentication server 130 may also receive as input login client location data 215 that may be determined using, for example, an IP address, nearby Wi-Fi access point data, and the like. Authentication server 130 takes input data 205, 210 and 215, and transforms the data via modules, such as modules 225-245, into output 220. Output 220 is an authorization granting the requesting user access to the requested resource provided that the user has passed the authentication checks performed by the server 130.

The authentication server 130 includes an authentication module 225, a permissions management module 230, a verification client application management module 235, a configuration module 240 and a data communication module 245. One or more of these modules may connect to one or more datasets or database tables 250-265 to execute queries, such as those written in Python, PhP, SQL, and the like, to retrieve and/or store data. Depending on the implementation, the modules 225-245 may be implemented in software, hardware, or a combination thereof. The operation of each of the modules will be described in additional detail herein.

The modules access one or more tables to perform the user authentication disclosed herein. The database tables include a user accounts table 250, a verification client table 255, an authentication rules table 260, a location table 265, a configuration table 270, a fraud data table 275 and a client table 280. The user accounts table 250 may include data fields such as user ID or username, password, biometric signature, name, address, email, mobile phone number or mobile identification number (MIN), unique device identifier, permissions, permitted entities, and the like. Verification client table 255 may include data fields such as user ID or username, mobile phone number, mobile model, mobile OS platform, preferred location method, and the like. Authentication rules table 260 may include data fields such as rule ID, conditions, outcome, threshold value, threshold reduction factor, and the like. Location table 265 may include data fields such as mobile telephone number, MAC address, IP address, date, time, login client location, verification client location, and the like. Config table 270 may include data fields such as client ID, rules ID, thresholds for attempts, and the like. Fraud data table 275 may include data fields such as location, fraud level, date, time, and the like. Client table 280 may include data fields such as client ID, client name, client address, billing, successful verification count, failed verification count, total verification count, and the like.

Authentication module 225 performs an authentication based on the first and second factors. In some embodiments, authentication module 225 performs an authentication based on the second factor, while an authentication based on the first factor is performed by another entity such as the web server hosting the website. The first and second factors of authentication are discussed in detail with respect to FIG. 7. To perform first and second factor authentication, authentication module 225 may receive and process input data 205, 210 and 215, along with data retrieved from database tables such as user accounts table 250, verification client table 255, authentication rules table 260, fraud table 275, client table 280, and the like. Furthermore, authentication module 225 may also generate and/or communicate output 220 directly or via data communication module 245 to a website or user. The authentication module may also store input data and/or other data generated from the processing in one or more database tables.

Authentication server 130 may further include permissions management module 230 configured to obtain and manage permission from users for location data acquisition and sharing, maintain a record of entities approved for conducting location-based authentication and validate requests for location-based authentication from various entities. Permissions management module 230 may also obtain, manage and track permission parameters such as permission expiration date.

Application management module 235 includes facilities for managing client applications that are installed on verification clients. In some implementations, the application management module includes computer executable instructions to coordinate installation of an application on the client, obtain and route permissions to permissions management module 230, periodically update the application, determine location sources (e.g., GPS, Cell-ID and Wi-Fi) for locating the client, and/or the like.

Configuration module 240 includes user interfaces for obtaining configuration parameters for authentication, and instructions for storing the configuration parameters in config table 270. For example, in one embodiment, a website may desire to implement the FMFA system, where a single authentication based on the second-factor is performed by authentication server 130. The website or client of the authentication server may then utilize a user interface to specify that only authentication using the second factor is to be performed, provide information such as client ID, select or specify rules for authenticating users, number of attempts that are allowed, and/or the like. The configuration module may obtain these configuration parameters, and store them in one or more database tables such as config table 270.

Data communication module 245 includes computer executable instructions for obtaining, processing and managing data including location data and fraud data. For example, the data communication module may communicate with a verification client and/or a location information service to locate the verification client. The module may also process and store location data in one or more database tables such as location table 265. The module may also obtain, process and provide output from the authentication module in the form of authorization output 220. In some implementations, one or more modules 225-245 may be consolidated into a single module.

Example Processing

FMFA system 200 utilizes location-based services, either directly or indirectly, to verify users during registration and, if so configured, during subsequent login attempts. The logic and data flow diagrams described below illustrate example processing performed by the FMFA system to authenticate users in a manner that imposes minimal burden on a user.

Figure 3:
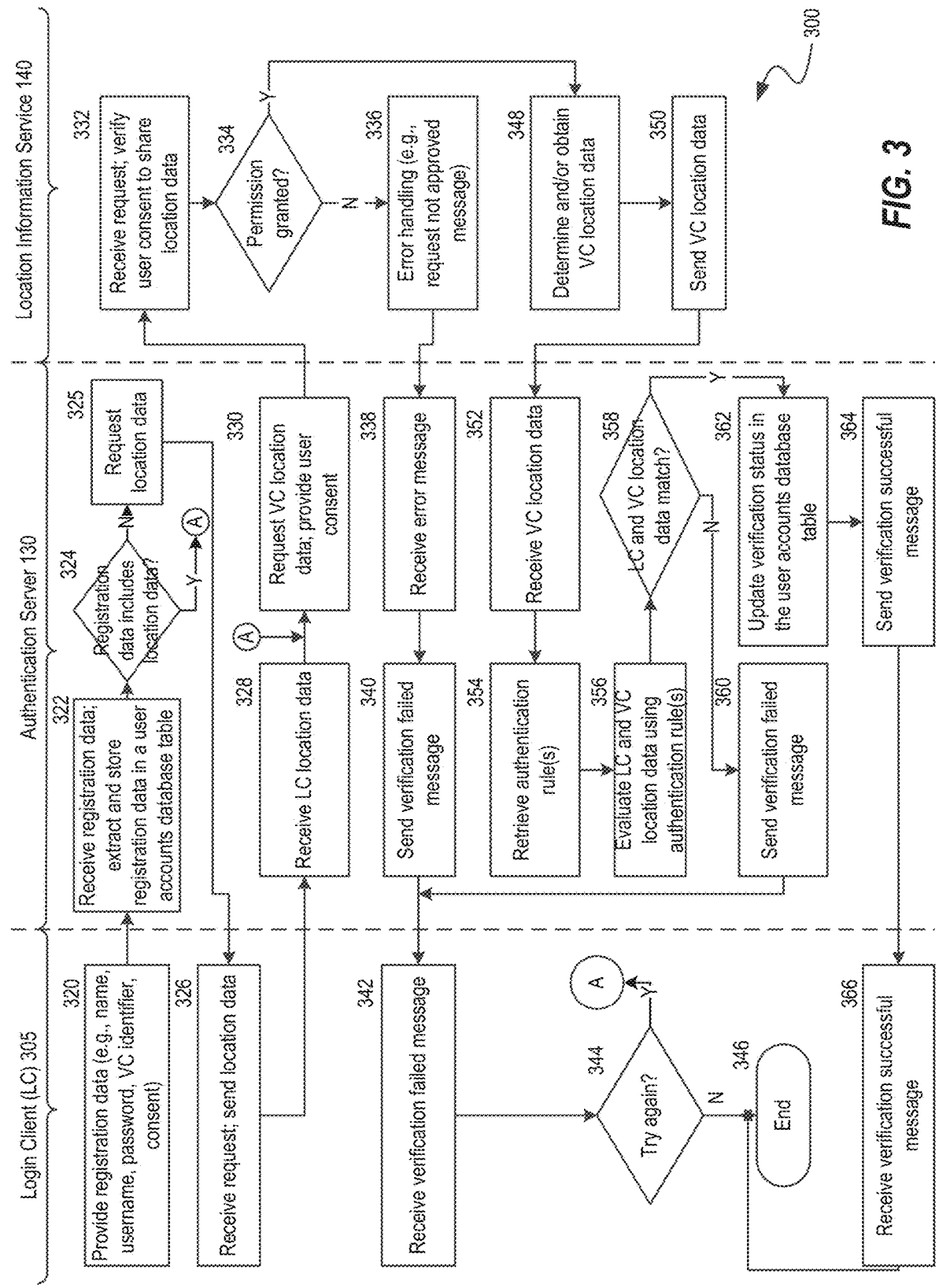
FIG. 3 is a logic flow diagram illustrating registration verification in a first embodiment of the FMFA system.

FIG. 3 is a logic flow diagram illustrating registration verification in a first embodiment of the FMFA system. As shown, the first embodiment of FMFA system leverages the location information service directly to obtain location information for authentication. A user may utilize a login client 305 to sign up or register for a user account with a website or application. The website may be hosted by a server (e.g., web server 150), while authentication server 130 may be responsible for verifying the registration of the user. Depending on the implementation, the authentication server may be an entity separate from the web server hosting the website, or it may be the one and the same server. Furthermore, in some implementations, certain aspects of the registration verification may be performed by the web server, while other aspects may be performed by the authentication server.

Referring to FIG. 3, at block 320, the login client provides registration data input by the user to the authentication server. The registration data may include, without limitation, name, username, password, a verification client identifier, login client identifier such as device ID, MAC address, and the like. The registration data may be provided as a part of a request to create a user account, and in some implementations, may include the user's consent to the terms and conditions of the website or application. The terms and conditions may vary with the website or application, but may include the user's consent to allow the authentication server to obtain location of the login and verification clients for authentication and/or other user-approved purposes.

At block 322, the authentication server 130 receives the registration data from the user via the login client. The authentication server parses the registration data to extract data corresponding to various registration fields and stores the extracted data in one or more database tables such as user accounts table 250. At decision block 324, the authentication server 130 determines if the location of the login client is included in the registration data received at block 322. If the login client location data is included in the registration data, processing continues to block 330. Conversely, if the login client location data is not included in the registration data, the authentication server 130 requests the login client to provide its location at block 325.

At block 326 the login client receives the request for location data from the authentication server and transmits the requested location data to the authentication server. In some implementations, the location data may be obtained from a browser being used for registration on the client device. Websites can request browsers, such as Mozilla Firefox, for location information. The browser can obtain permission from the user to gather and selectively share information relating to nearby wireless routers or hot spots (e.g., Wi-Fi data). The gathered information is provided to a location information service 140, such as Google Location Services, which provides geo-location services. The location information service returns an approximate location of the login client to the browser, which in turn shares the approximate location with the website. In some implementations, the authentication server may locate the login client based on the IP address of the login client, which is usually included in web service requests (e.g., HTTP(S) POST requests) from the login client. In some implementations, the website may use cookies, and the like, to locate and/or identify the login client. A cookie is a small text file that is downloaded from a website and stored by the browser on the login client. The cookie may be instructed by the server to store and forward pieces of information that could be used for locating and/or identifying the login client.

At block 328, the authentication server receives location data from the login client. At block 330, the authentication server requests verification client location data from the location information service. The request, in one implementation, may be in the form of a web service call and may include at least an identifier, such as a mobile telephone number, of the verification client. At block 330, the authentication server may also forward consent obtained from the user to the location information service, authorizing the location information service, on behalf of the user, to locate the verification client and provide location information to the authentication server. Alternatively, the user may directly communicate with the location information service to provide the user's consent. For example, the location information service may send a text message to the verification client to confirm that the user agrees to share location information with the authentication server for authentication purposes. At block 332, the location information service receives the request to locate the verification client from the authentication server, and obtains user consent, directly from the user or indirectly from the authentication server.

At decision block 334, if the user does not grant permission to share the location of the verification client, the location information service may initiate error handling procedures block 336. For example, the location information service may send a message to the authentication server indicating that the user did not approve the location data request. The authentication server receives the error message at block 338 and then forwards a verification failed message to the login client at block 340. The verification failed message may be received and displayed at the login client at block 342. If the user desires to make another attempt at verification, the user may first resolve the consent issue by providing consent to the authentication server and/or the location information service, and request the authentication server to make another attempt at verification. Upon receiving the request from the login client, the authentication server may transmit another request at block 330 to the location information service to locate the verification client. If the user does not desire to make a second attempt at registration verification, the process may end at block 346.

Alternatively, at decision block 334, if the permission is granted by the user, the location information service determines and/or obtains verification client location data at block 348. The verification client is located using any suitable positioning technologies discussed above. At block 350, the location information service sends the verification client location data to the authentication server.

The authentication server receives the verification client location data at block 352. At block 354, the authentication server retrieves one or more authentication rules, on the basis of which the authentication server may determine whether or not the verification is successful. Examples of authentication rules that may be implemented are discussed in detail with respect to FIG. 9A. At block 356, the authentication server, which is now in possession of location data corresponding to both the login client and the verification client, evaluates the location data using applicable authentication rules. For example, the authentication server may implement an authentication rule that sets forth as a condition that the verification client and login client locations must be within 50 m of each other to generate a match. A match, in this instance, is taken to be an indication that the user, registering via the login client, also has the verification client in his or her possession.

At decision block 358, the authentication server determines if there is a match based on the location data and the applicable authentication rules. In some cases, there will not be a match between the two locations. For example, the distance between the login client and the verification client may be greater than the 50 m threshold specified in the authentication rule. In such a situation, the verification cannot be obtained, and a verification failed message is sent to the login client at block 360. The login client receives and displays the message at block 342, and may provide the user an option to attempt verification again at block 344. In some cases, the two location data will match, resulting in a successful verification of the registration. It will be appreciated that using the location-based method of authentication eliminates the need for the user to take any additional steps such as entering a code received via email, text message, or phone, clicking on a link, and the like, to complete the registration verification step that websites usually require before creating an account that provides the user access to the website.

Upon successful verification, at block 362, the authentication server updates the verification status of the user's account in a database table such as the user accounts database table 250. At block 364, the authentication server sends a verification successful message to the login client. The login client receives the message at block 366, and may provide an indication to the user that the login was successful. The process then concludes at block 346.

Figure 4A:
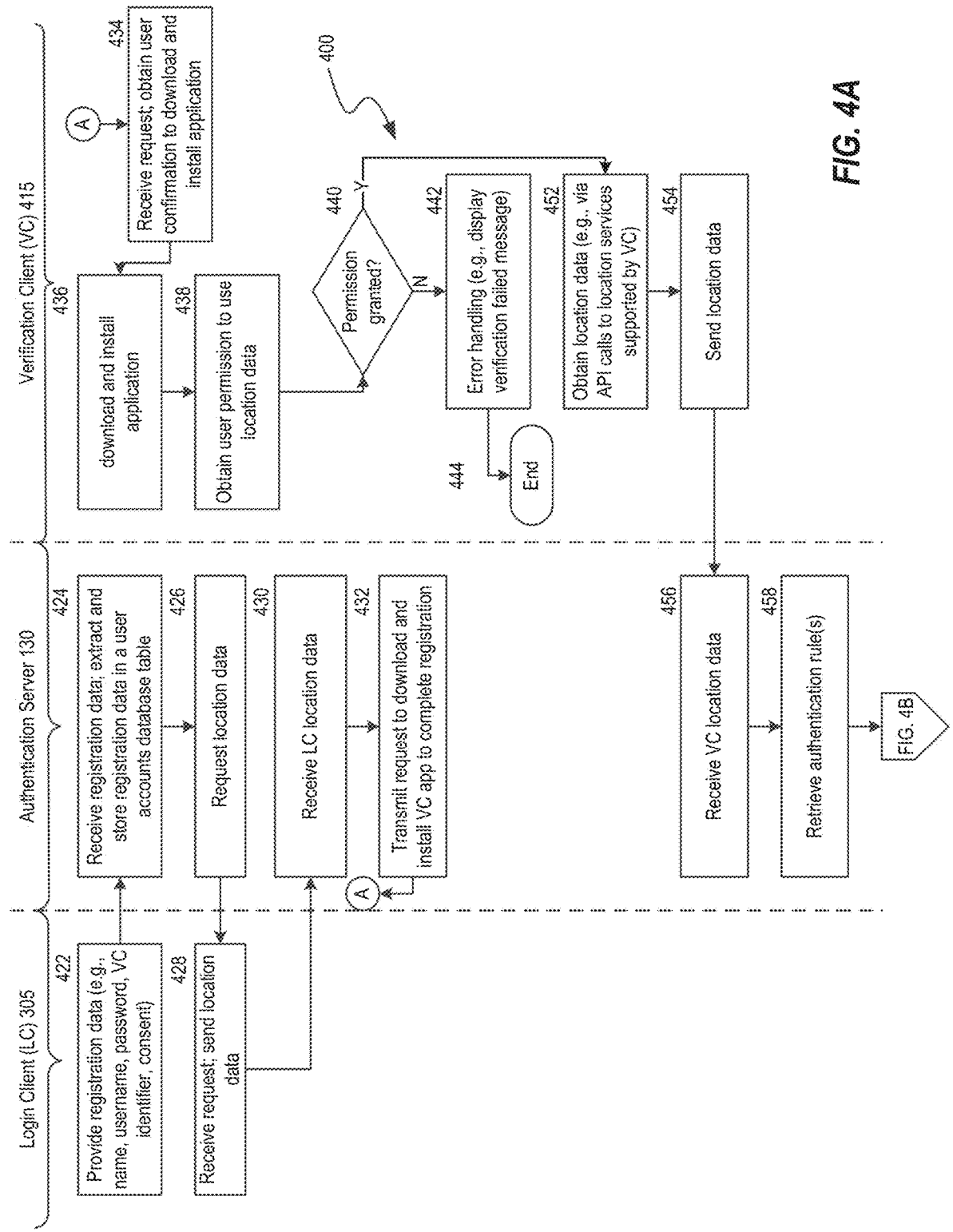
FIGS. 4A-B are logic flow diagrams illustrating registration verification in a second embodiment of the FMFA system.
Figure 4B:
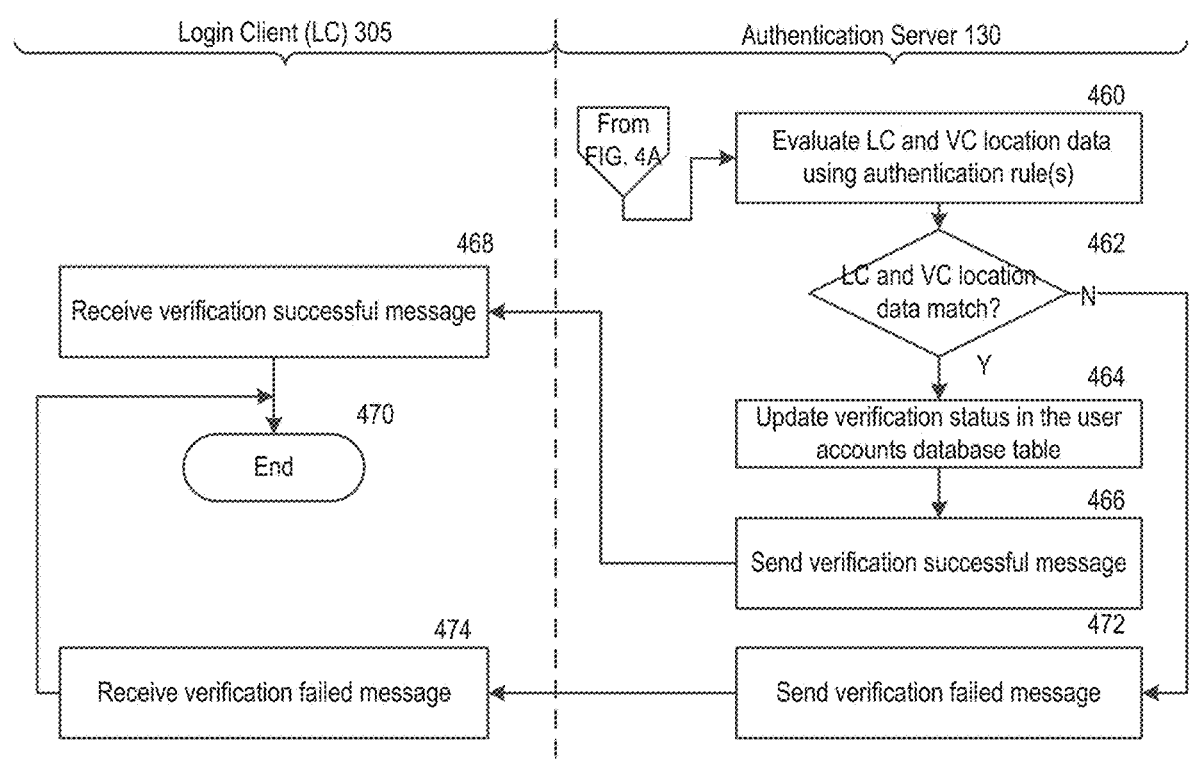

FIGS. 4A-B are logic flow diagrams illustrating registration verification in a second embodiment of the FMFA system. As shown, the second embodiment of the FMFA system leverages the verification client directly to obtain location information for authentication. In the second embodiment, the verification client may be a mobile device such as a smart phone, which allows users to download and install a client application from an application store. Most smart phones allow applications to access location services supported by the device via Application Programming Interfaces (APIs) or call backs to determine the location of the device. Smart phones may use GPS/A-GPS receiver data, and/or data obtained from the location information service (e.g., Android's Network Location Provider) that uses Cell-ID and Wi-Fi hotspot information to determine their location.

Referring to FIG. 4A, login client 305 provides registration data entered by the user to authentication server 130 at block 422. The authentication server receives and parses the registration data at block 424 to extract various fields of information and store the extracted data in one or more database tables such as user accounts table 250. At block 426, the authentication server requests location of the login client. At block 428, the login client receives the request and transmits the location data in response to the request. As previously discussed, in some implementations, the login client may be located using information provided by the browser, cookies, and/or the like. In some implementations, the login client may be located based on the IP address included in the registration data submission at block 422. At block 430, location data is received, either in a form that directly provides the location information (e.g., latitude and longitude coordinates) or in a form from which the location can be determined (e.g., from IP address). At block 432, the authentication server transmits a request to download and install an application on verification client 415 to complete the registration process. In some implementations, the request may be sent to the verification client in the form of an SMS/MMS message, an email, an automated phone call or voice message, or the like.

At block 434, the request to install the application is received at the verification client 415. If the user confirms that the application is to be installed, at block 436 the application is downloaded and installed on the verification client. In some implementations, at block 438 the verification client may request user permission to obtain and use location data (e.g., GPS location information from the device or location information from a location information service). At decision block 440, if the permission is not granted by the user, the verification client application is unable to obtain the location information and an error handling procedure is invoked at block 442. The error handling procedure may include, for example, displaying a verification failed message at the verification client or generating and sending a verification failed message to the login client. The process then concludes at block 444.

At decision block 440, if the permission to use location data is granted by the user, processing continues to a block 452. At block 452, the verification client obtains its location by such means as callbacks or API calls to a location information service. Once location data is obtained, the verification client sends the location data to the authentication server at block 454.

The authentication server receives the verification client location data at block 456. At block 458, the authentication server retrieves one or more authentication rule(s) for processing the location data associated with the verification client and the login client. Example authentication rules are discussed in detail with respect to FIG. 9A. Referring to FIG. 4B, the authentication server 130 evaluates the login client and verification client location data using the authentication rule(s) at block 460. At decision block 462, the authentication sever determines if the location data matches in accordance with the authentication rule(s). If the login client and verification client location data constitute a match in accordance with the authentication rule(s), the user account is considered as verified and processing continues to block 464. At block 464, a verification status field in the user accounts table 250 is updated to indicate the verified status of the account. The authentication server may also send a message indicating that the verification was successful to the user, the verification client and/or the login client at block 466. The verification successful message is received by the login client at block 468.

Alternatively, if there is no match in verification client and login client location data as defined by the authentication rule(s), the authentication server generates and sends a message indicating that the verification has failed to the user, the verification client, and/or the login client at block 472. The verification failed message is received by the login client at block 474. Following transmission and receipt of the verification successful/failed messages, the process concludes at block 470. In some implementations, when the location-based registration verification fails, a backup verification method, similar to the backup authentication method described with respect to FIG. 8 may be implemented to verify the user.

Figure 5:
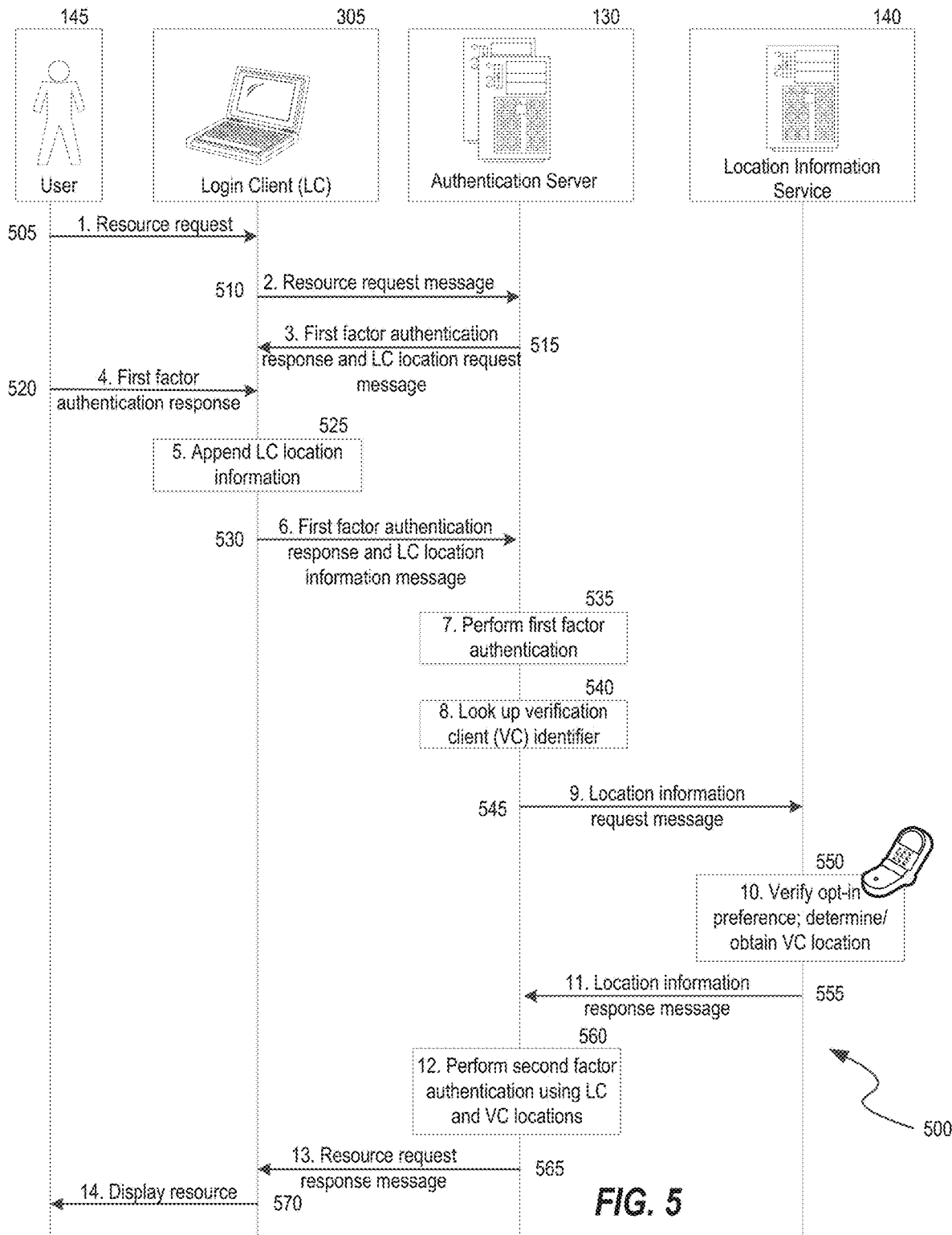
FIG. 5 is a data flow diagram illustrating user authentication in a first embodiment of the FMFA system.

Following successful registration verification of the user account, the user may desire to login and access, for example, an online account that is secured by the FMFA system. FIG. 5 is a data flow diagram illustrating user authentication in a first embodiment of the FMFA system. In the first embodiment, the flow of data is among user 145, login client 305, authentication server 130 and location information service 140. The authentication server, may be implemented within a web server, such that the web server and the authentication server are one and the same. Alternatively, the authentication server and the web server may be separate servers that are operated by or under the control of the same entity. Although the discussion herein is limited to implementation of two factors of authentication, additional factors of authentication may be incorporated if desired.

Referring to FIG. 5, the user submits a resource request 505. The resource request may be a request to access an online account or a data locker, download a file, place an order, or any other action that is secured. The login client packages and transmits the request in a message 510 to the authentication server. The authentication server receives the resource request message, and responds with a request 515 to the user to provide a response to a first factor of authentication. Additionally, in some implementations, the authentication server may instruct the browser of the login client to provide location data stored in an associated cookie, and the like. A web page including form fields or other data-entry interface where the user provides a response to the first factor of authentication is displayed at the login client. The user inputs the response 520 to the first factor of authentication. At block 525, the login client packages the user input for transmission to the authentication server. The message may be packaged, for example, as an HTTP(S) POST message. In some implementations, the login client may append to the HTTP(S) POST message any location data from cookies, and the like that it received. The HTTP(S) POST message may also include an IP address of the login client. The login client transmits the HTTP(S) POST message 530 to the authentication server for processing.

At block 535, the authentication server authenticates the user based on the first factor of authentication. At block 540, the authentication server retrieves an identifier of the verification client. The identifier may include the mobile telephone number, device identifier, or the like. The authentication server transmits a location information request message 545 to the location information service. The request may be made as a web service call or an API call, for example. The request message includes the identifier of the verification client. In response, the location information service verifies the opt-in preference of the owner of the verification client, and if verified, determines and/or obtains the location of the verification client at block 550. The location information is transmitted in a response message 555 to the authentication server.

At block 560, the authentication server authenticates the user using the second factor of authentication. The second factor authentication is based on the login client and verification client location data. After the user is authenticated, a resource request response message 565, including web pages corresponding to the requested resource, is provided to the login client. The provided resource 570 is then displayed at the client.

Figure 6:
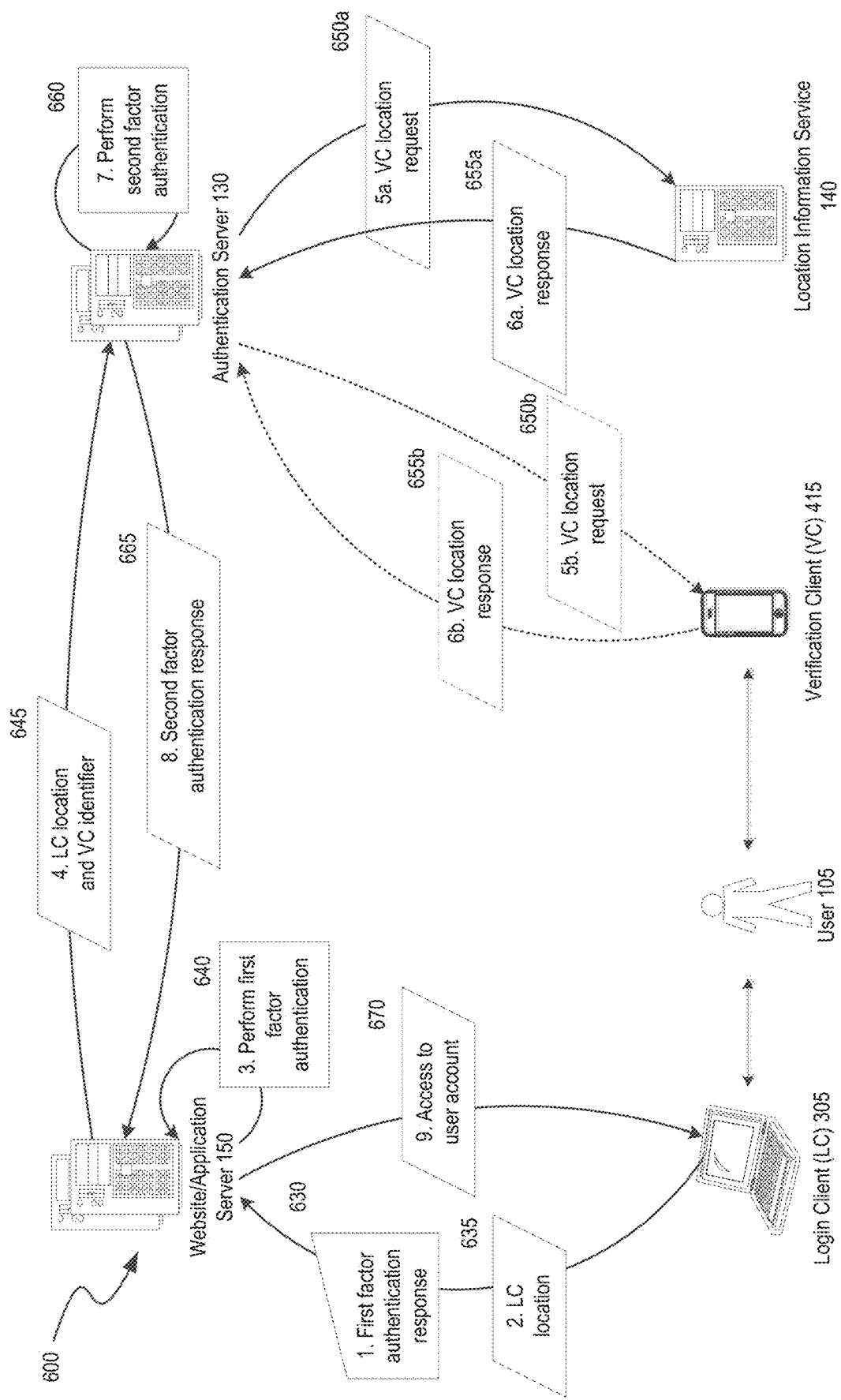
FIG. 6 is a data flow diagram illustrating user authentication in a second embodiment of the FMFA system.

FIG. 6 is a data flow diagram illustrating user authentication in a second embodiment of the FMFA system. In the second embodiment, web server 150 and authentication server 130 are separate entities. The web server may be controlled and/or operated by the website or application owner, while the authentication server may be controlled and/or operated by an entity that provides location based authentication services. User 105 uses login client 305 to input his or her response 630 to a first factor of authentication. As previously discussed, the response 630 may include a username and password combination, a finger print, a retina scan, a voice command, and the like. The response 630 is transmitted to the web server. In some implementations, in the response 630 or in a separate message, the login client also transmits location data 635 to the web server. Login client location data 635 may include location information from a cookie, or the like, or an internet identifier such as an IP address from which location may be determined. At block 640, the web server authenticates the user based on the first factor of authentication. Additional details relating to the process implemented in block 640 are discussed with respect to FIG. 7.

The web server transmits a message 645 to the authentication server, including login client location data and a verification client identifier. In some implementations, the web server may forward data such as the IP address, nearby Wi-Fi access point data, or the like, to the authentication server. The authentication server then determines a location corresponding to the provided data by, for example, querying databases that maintain correspondence between IP addresses or Wi-Fi access points and geographic or physical location. Alternatively, the location information service may also provide location corresponding to such data.

In some implementations, the authentication server prepares and sends verification client location request 650*a*, including the verification client identifier, to location information service 140. The location information service processes the request and returns verification client location response 655*a*, including location data of the verification client, to the authentication server. The request and response may be via an API or other defined interface.

Alternatively, instead of leveraging the services of the location information service, the authentication server 130 may transmit a verification client location request 650*b* to the verification client. The request may be handled by an application installed on the verification client, and as long as prior user consent has been provided, user input may not be necessary. The application obtains location from the GPS receiver in the verification client and/or from a location information service associated with the device (e.g., Android's Network Location Provider if the verification client is an Android based smart phone). The obtained location is then provided in verification client location response 655*b* to the authentication server.

The authentication server, with both the login client and verification client location data stored in its memory, authenticates the user based on a second factor of authentication at block 660. Details relating to the process implemented in block 660 are discussed with respect to FIG. 7. Upon completing the second factor of authentication, the authentication server transmits the results in an authentication response 665 to the web server. The web server processes the response 665 and transmits a response 670 to the requesting login client. An implementation of the second embodiment of the FMFA system allows a web server to authenticate the user based on a first factor of user credentials stored in a database. By performing the first factor of authentication, the web server need not share the database containing user credentials with the authentication server. Furthermore, using the authentication server to implement the second factor of authentication allows for improved security that is unnoticeable to users, while lessening the burden on the web server.

Figure 7:
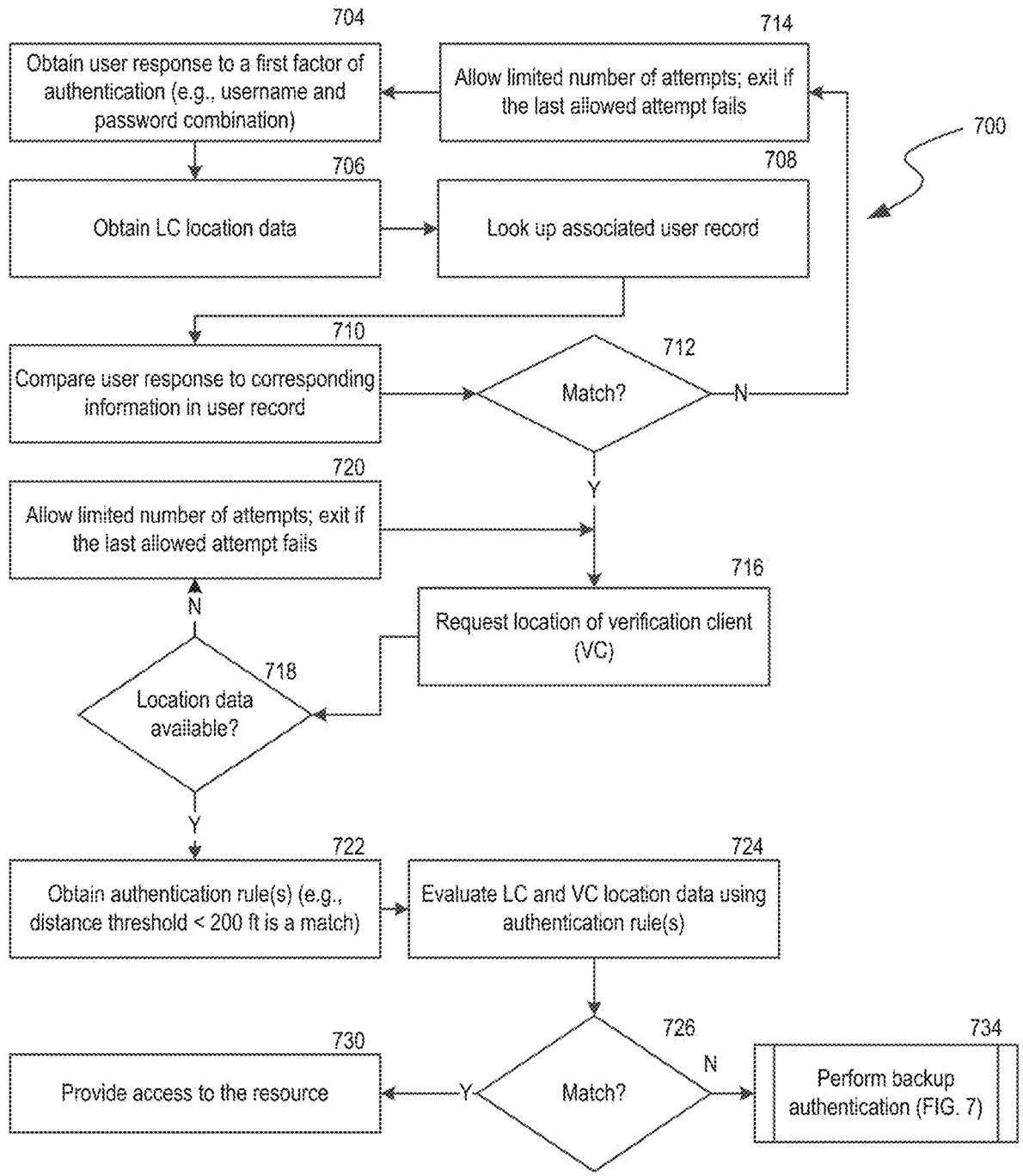
FIG. 7 is a logic flow diagram illustrating authentication by the FMFA system.

FIG. 7 is a logic flow diagram illustrating authentication by the FMFA system. As shown, at block 704, a user response to a first factor of authentication may be obtained. For example, when login credentials are requested (e.g., something the user knows), the user may provide a username and password combination, a PIN code, a gesture, and/or the like. In another example, if the first factor of authentication is related to something the user has, the user may respond with a card swipe, a card identifier, a one time password or token, and the like. At block 706, location data of the login client is obtained using the techniques discussed above. At block 708, an associated user record is identified by constructing a query based on the user response (e.g., username) and executing the query on a database table (e.g., user accounts table 250). At block 710, the user response and the data in the identified user record are compared to determine if the user response matches the values in the corresponding fields of the user record. If both the username and password values provided in the user response match the values in the username and password fields of the identified user record at decision block 712, the system considers the user to be authenticated based on the first factor. If there is no match at decision block 712, the user may be allowed a limited number of attempts to provide the correct response at block 714. If all attempts to provide a correct response fail, the process exits, with the user being denied access to the resource secured by the authentication procedure.

Alternatively, if there is a match at decision block 712, the user is considered authenticated using the first factor of authentication. At block 716, the location of the verification client is requested. Any of the previously discussed techniques and methods may be utilized to locate the verification client. Sometimes, it may not be possible to locate the verification client, because of reasons such as the verification client being turned off, or not connected to a network (e.g., a Wi-Fi, cellular and/or satellite network). If the location data is unavailable at decision block 718, a limited number of attempts may be made at block 720 to obtain the location. After the maximum number of attempts has been made without success, the process may exit, with the user being denied access to the resource secured by the authentication procedure.

However, if location data is determined to be available at decision block 718, authentication rules are obtained at block 722 for authenticating the user using a second factor. Authentication rules may be established by the website to define the definition of a location match and/or other conditions for a location authentication to be successful. FIG. 9A is a table 935 that shows a listing of example authentication rules that might be utilized by the FMFA system. Specifically, table 935 lists conditions that specify the definition of a match in column 940 and corresponding outcomes in column 945. At block 724, the verification client and login client location data may be compared to determine whether the location data meet one or more conditions in column 940 and the like. The conditions may be individually applied, or may be combined in various permutations to generate a compound authentication rule. For example, two conditions 950 and 954 may form an authentication rule. In order to evaluate the two pieces of location data using the authentication rule, the distance between the location of login client and verification client is determined and the distance compared to a specified threshold, such as the one configured using the configuration module 240, and stored in a database table such as configuration table 270. If, for example, the distance is greater than a predefined threshold, as specified by condition 950, there is no match at decision block 726, and the authentication has failed as specified in outcome 952. In one implementation, when the location based authentication is unsuccessful, the system may perform a backup authentication at block 734. Details of the backup authentication process are described with respect to FIG. 8. Conversely, if the distance is less than or equal to a predefined threshold, as specified by condition 954, the system registers a match at decision block 726, and the authentication is considered successful. The user is then provided access to the resource at block 730.

The two condition authentication rule discussed above may be modified to include another condition, for example, condition 958. If either the login client or verification client location is determined to be in an area noted or designated as an area with high incidence of fraud, the outcome 960 of the authentication may be a failed authentication with no match It will be appreciated that a variety of permutations may be used to specify which conditions must be met for there to be a match between locations.

Figure 8:
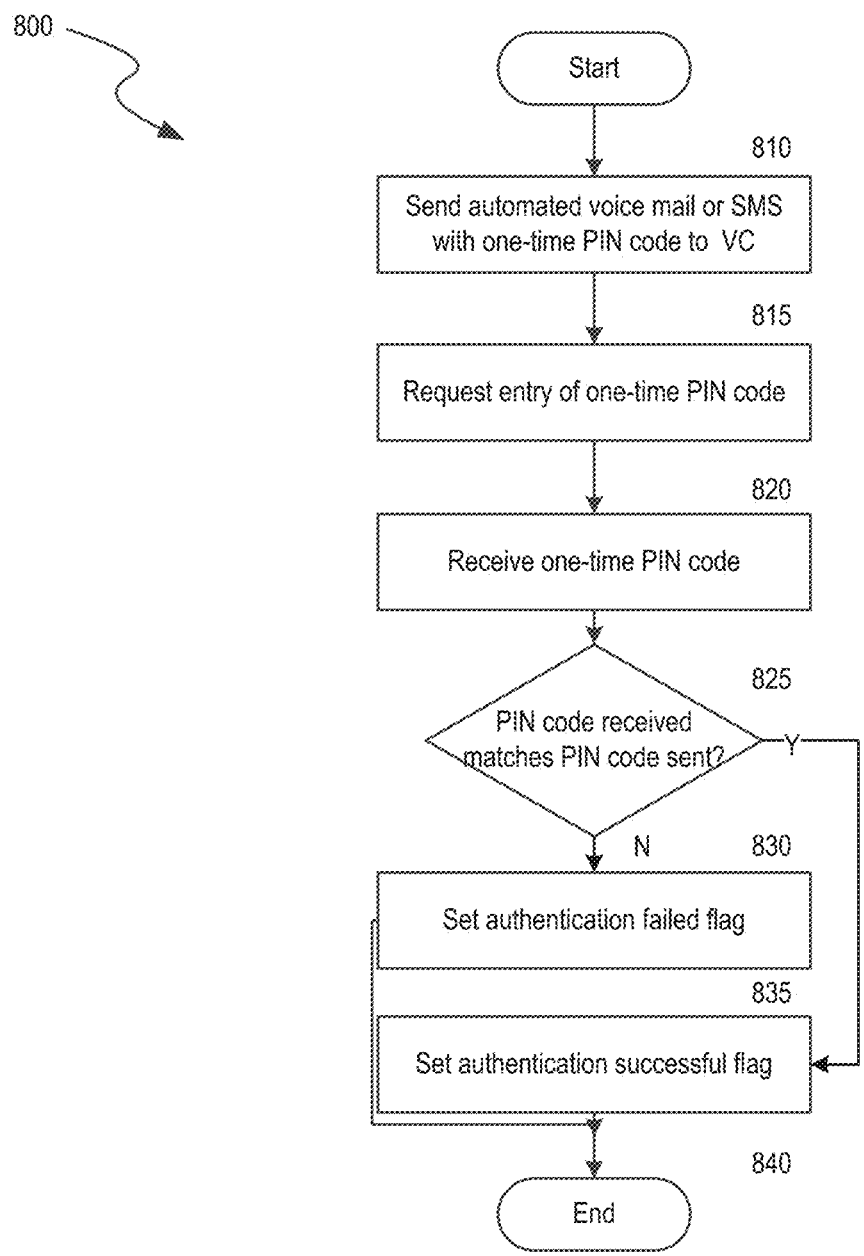
FIG. 8 is a logic flow diagram illustrating backup authentication by the FMFA system.
Figures 9A, 9B:
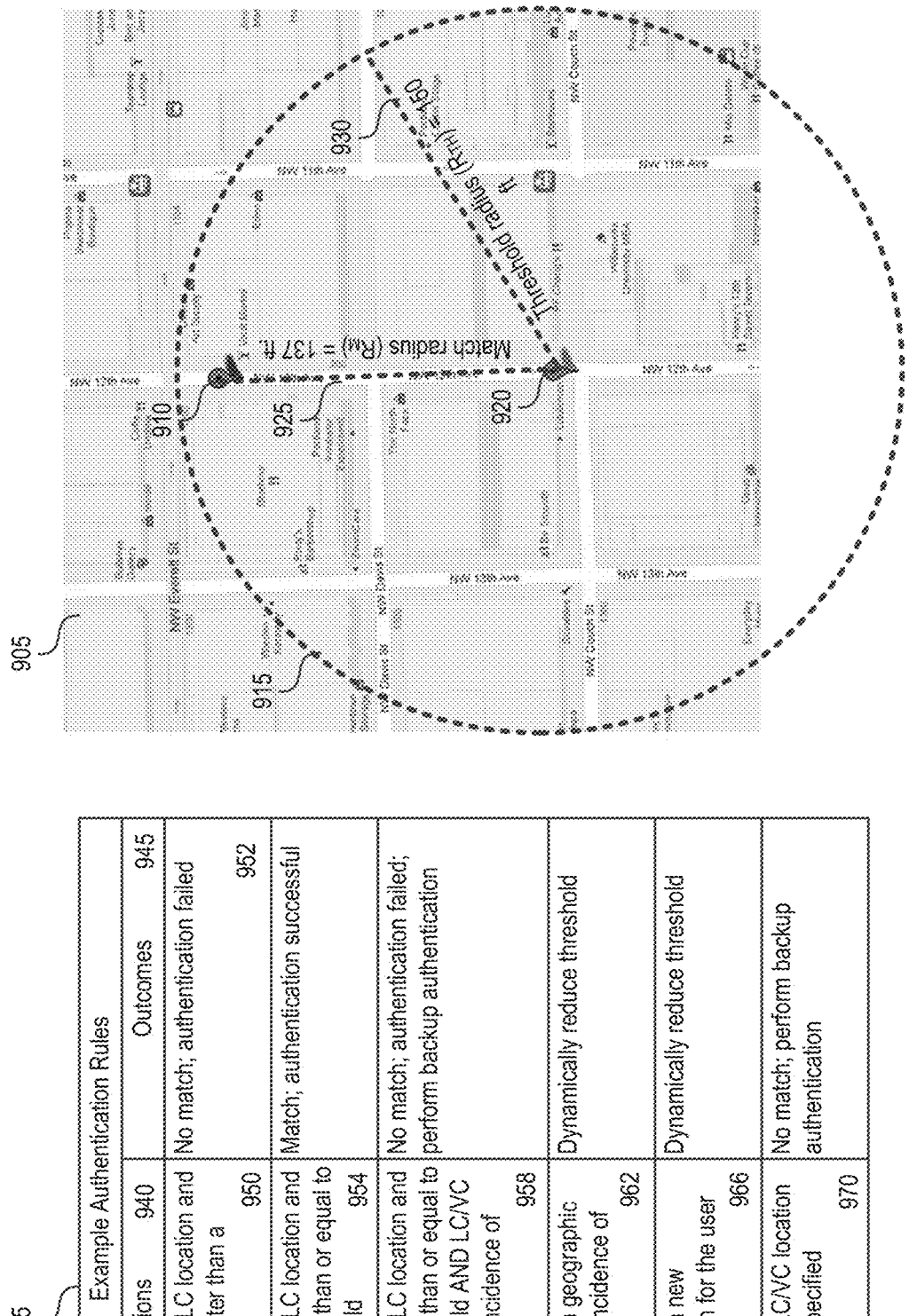
FIG. 9A is a table listing example authentication rules.
FIG. 9B is a diagram illustrating an exemplary match when authenticating a user.

FIG. 8 is a logic flow diagram illustrating backup authentication by the FMFA system. The method 800 starts at block 810 by sending an automated voice call or SMS/MMS, containing a one-time PIN code, to the verification client. At block 815, the user of the verification client is requested to enter the one-time PIN code in an area provided on the login screen displayed at the login client. At block 820, the one-time PIN code is received by the FMFA system and compared with the one-time PIN code sent to the verification client to determine if they are the same. If the PIN code received matches the PIN code sent at decision block 825, the backup authentication is considered successful. An indicator such as a flag may be set to reflect the successful authentication at block 835. Alternatively, the sent and received PIN codes may not match at decision block 825, in which case the indicator may be set to reflect the failed authentication at block 830. Upon determining the outcome of the authentication, the process exits at block 840.

FIG. 9A is a table listing example authentication rules in an embodiment of the FMFA system. As previously discussed, an authentication rule may include one or more conditions 940 and corresponding outcomes 945. In one implementation, for example, an authentication rule may be defined to include multiple conditions and an order or priority according to which the conditions are to be evaluated. When location data corresponding to the login client and verification client are obtained, condition 962 may be used to determine if the login client or verification client location is in a geographic location with a high incidence of fraud. The information correlating geographic location with incidence of fraud may be obtained from one or more database tables such as fraud table 275. If the condition is determined to be true, the threshold for what is considered a location match is dynamically reduced as indicated by the corresponding outcome. The amount of reduction may depend on various factors including severity of the incidence of fraud, last fraud event report date, and the like, and may be preconfigured using the configuration module 240. The reduced threshold may then be used to evaluate conditions 950 and 954 as previously discussed. Another example of an authentication rule may include a combination of conditions 962, 966, 950 and 954. After evaluating condition 962 and dynamically reducing the threshold in accordance with outcome 964, the next condition 966 may be evaluated. If the login client or verification client location is a new geographic location for the user, that is, the user has not logged in from that geographic location before, the threshold may be further reduced. The reduced threshold may be used for evaluating conditions 950 and 954. Some conditions, such as condition 970, may look at the margin of error in the location of login client or verification client, and if the margin of error is greater than a threshold or tolerance value, the result may not result in a match. Instead a backup authentication procedure, such as the one described with respect to FIG. 8, may be initiated. The conditions, outcomes and rules discussed herein are exemplary, and are not exhaustive. Various other conditions and combinations of such conditions are within the scope of this application.

FIG. 9B is a diagram illustrating an exemplary match in an embodiment of the FMFA system. The position of the login client is indicated by reference numeral 920, and the position of the verification client is indicated by reference numeral 910. The distance 925 between the two locations, in this example, is 137 ft. With the location of the login client as the center, a circle of radius 930 may be drawn to establish perimeter 915. If the position of the verification client is within the perimeter 915, then there is a match. The radius of the circle may be referred to as the threshold radius ($R_{TH}$), which is 150 ft. in this example, and the distance between the verification client and the login client may be considered the match radius ($R_M$). While this example visualizes the match condition in terms of radii, non-circular or any other arbitrary perimeter may be used to define and/or visualize match conditions.

CONCLUSION

Those skilled in the art will appreciate that the actual implementation of a data storage area may take a variety of forms, and the phrase "data storage area" is used herein in the generic sense to refer to any area that allows data to be stored in a structured and accessible fashion using such applications or constructs as databases, tables, linked lists, arrays, and so on.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative combinations or subcombinations. Each of these processes or blocks may be implemented in a variety of different ways. Also, while processes or blocks are at times shown as being performed in series, these processes or blocks may instead be performed or implemented in parallel, or may be performed at different times.

In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

I claim:

1. A computer-implemented method of authenticating a user, the method comprising:
    maintaining fraud location data characterizing fraud levels associated with a plurality of locations;
    receiving a request from a user of a login client to be authenticated, wherein the request includes a user identifier, a verification client identifier associated with a verification client, and a login client location;
    obtaining, based on the verification client identifier, a verification client location;
    determining a distance between the login client and the verification client based on the login client location and the verification client location;
    determining, based on the fraud location data, a fraud level associated with each of the login client location and the verification client location;
    determining a threshold distance based on the fraud level associated with the login client location or the fraud level associated with the verification client loaction;
    generating a location match when the determined distance between the login client and the verification client is within the threshold distance; and
    generating a response to authenticate the user or not authenticate the user based on whether login client location and verification client location generated a location match.

2. The method of claim 1, wherein the fraud level indicates the severity of fraud associated with the corresponding location, and wherein the threshold distance is reduced the more severe the fraud.

3. The method of claim 1, wherein the fraud location data further includes fraud dates associated with the plurality of locations, and wherein the threshold distance is further based on the recency of the fraud dates associated with the login client location and the verification client location.

4. The method of claim 1, wherein the login client location is determined based on an internet protocol (IP) address associated with the login client.

5. The method of claim 1, wherein the verification client location is determined using a global positioning system (GPS).

6. The method of claim 1, wherein the verification client is a mobile phone and wherein the verification client identifier is a mobile phone number.

7. The method of claim 1, wherein the verification client location is generated by a wireless network based on an Angle of Arrival (AOA).

8. The method of claim 1, wherein the verification client location is obtained by:
    transmitting a request for the location of the verification client to a wireless network to which the verification client is connected, the request including the verification client identifier; and
    receiving from the wireless network, in response to the request, the location of the verification client.

9. A non-transitory computer-readable medium containing instructions configured to cause one or more processors to perform a method of authenticating a user, the method comprising:
    maintaining fraud location data characterizing fraud levels associated with a plurality of locations;
    receiving a request from a user of a login client to be authenticated, wherein the request includes a user identifier, a verification client identifier associated with a verification client, and a login client location;
    obtaining, based on the verification client identifier, a verification client location;
    determining a distance between the login client and the verification client based on the login client location and the verification client location;
    determining, based on the fraud location data, a fraud level associated with each of the login client location and the verification client location;
    determining a threshold distance based on the fraud level associated with the login client location or the fraud level associated with the verification client location;
    generating a location match when the determined distance between the login client and the verification client is within the threshold distance; and
    generating a response to authenticate the user or not authenticate the user based on whether login client location and verification client location generated a location match.

10. The non-transitory computer readable medium of claim 9, wherein the fraud level indicates the severity of fraud associated with the corresponding location, and wherein the threshold distance is reduced the more severe the fraud.

11. The non-transitory computer readable medium of claim 9, wherein the fraud location data further includes fraud dates associated with the plurality of locations, and wherein the threshold distance is further based on the recency of the fraud dates associated with the login client location and the verification client location.

12. The non-transitory computer readable medium of claim 9, wherein the login client location is determined based on an internet protocol (IP) address associated with the login client.

13. The non-transitory computer readable medium of claim 9, wherein the verification client location is determined using a global positioning system (GPS).

14. The non-transitory computer readable medium of claim 9, wherein the verification client is a mobile phone and wherein the verification client identifier is a mobile phone number.

15. The non-transitory computer readable medium of claim 9, wherein the verification client location is generated by a wireless network based on an Angle of Arrival (AOA).

16. The non-transitory computer readable medium of claim 9, wherein the verification client location is obtained by:
   transmitting a request for the location of the verification client to a wireless network to which the verification client is connected, the request including the verification client identifier; and
   receiving from the wireless network, in response to the request, the location of the verification client.

* * * * *